United States Patent
Smith et al.

(10) Patent No.: US 7,168,779 B2
(45) Date of Patent: Jan. 30, 2007

(54) IMAGE PROCESSING TO MASK LOW DROP VOLUME DEFECTS IN INKJET PRINTERS

(75) Inventors: Glenn K. Smith, Webster, NY (US); Andrew S. Yeh, Portland, OR (US)

(73) Assignee: Fuji Xerox Co., Ltd., Tokyo (JP)

( * ) Notice: Subject to any disclaimer, the term of this patent is extended or adjusted under 35 U.S.C. 154(b) by 196 days.

(21) Appl. No.: 10/751,645

(22) Filed: Jan. 6, 2004

(65) Prior Publication Data

US 2005/0146543 A1    Jul. 7, 2005

(51) Int. Cl.
*B41J 29/38* (2006.01)

(52) U.S. Cl. .......................... 347/19; 347/6

(58) Field of Classification Search ............ 347/6, 347/19
See application file for complete search history.

(56) References Cited

U.S. PATENT DOCUMENTS

| | | | |
|---|---|---|---|
| 5,192,959 A | 3/1993 | Drake et al. | |
| 5,650,802 A * | 7/1997 | Suzuki et al. | 347/9 |
| 6,042,211 A | 3/2000 | Hudson et al. | |
| 6,238,112 B1 * | 5/2001 | Girones et al. | 400/74 |
| 6,254,217 B1 * | 7/2001 | Askeland et al. | 347/43 |
| 6,406,115 B2 * | 6/2002 | Mantell et al. | 347/15 |
| 6,488,354 B2 * | 12/2002 | Hosono | 347/23 |
| 6,533,384 B1 * | 3/2003 | Vega et al. | 347/19 |
| 2005/0083364 A1 * | 4/2005 | Billow | 347/19 |

* cited by examiner

*Primary Examiner*—Manish S. Shah
*Assistant Examiner*—Laura E. Martin
(74) *Attorney, Agent, or Firm*—Oliff & Berridge, PLC (57) ABSTRACT

A method and apparatus for masking low drop volume print defects in inkjet printers. In one exemplary embodiment, the invention obtains a print mask, determines a likelihood that an individual ink ejection nozzle will produce a low drop volume, determining a correction factor, and compensates for the low drop volume. The low drop volume may be compensated by increasing the drop intensity, modifying the print mask, or combinations of both.

25 Claims, 6 Drawing Sheets

| NO LATENCY | | LEVEL 1 SEVERITY | | LEVEL 2 SEVERITY | |
|---|---|---|---|---|---|
| CURRENT INTENSITY LEVEL | NUMBER OF DROPS | NEW INTENSITY LEVEL | NUMBER OF DROPS | NEW INTENSITY LEVEL | NUMBER OF DROPS |
| 0 | 0 | 0 | 0 | 1 | 2 |
| 1 | 2 | 2 | 4 | 2 | 4 |
| 2 | 4 | 2 | 4 | 2 | 4 |

Fig. 5B

| NO LATENCY | | LEVEL 1 SEVERITY | | LEVEL 2 SEVERITY | |
|---|---|---|---|---|---|
| CURRENT INTENSITY LEVEL | NUMBER OF DROPS | NEW INTENSITY LEVEL | NUMBER OF DROPS | NEW INTENSITY LEVEL | NUMBER OF DROPS |
| 0 | 0 | 0 | 0 | 1 | 1 |
| 1 | 1 | 2 | 2 | 2 | 2 |
| 2 | 2 | 3 | 3 | 3 | 3 |
| 3 | 3 | 3 | 3 | 3 | 3 |

Fig. 5C

| NO LATENCY | | LEVEL 1 SEVERITY | | LEVEL 2 SEVERITY | |
|---|---|---|---|---|---|
| CURRENT INTENSITY LEVEL | NUMBER OF DROPS | NEW INTENSITY LEVEL | NUMBER OF DROPS | NEW INTENSITY LEVEL | NUMBER OF DROPS |
| 0 | 0 | 0 | 0 | 1 | 1 |
| 1 | 1 | 2 | 2 | 2 | 2 |
| 2 | 2 | 3 | 4 | 3 | 4 |
| 3 | 4 | 3 | 4 | 3 | 4 |

Fig. 6

IMAGE PROCESSING TO MASK LOW DROP VOLUME DEFECTS IN INKJET PRINTERS

BACKGROUND OF THE INVENTION

1. Field of Invention

The present invention relates to a method and apparatus, particularly suitable for use in ink-jet printing apparatus, for minimizing printing defects which are caused by ejecting smaller than desired drops.

2. Description of Related Art

Liquid ink printers have at least one print-head from which droplets of liquid ink are directed towards a recording medium. Various types are known. Typically, they are of a continuous stream or a drop-on-demand type. Examples include piezoelectric, acoustic, micro-electro-mechanical systems (MEMS), phase change wax-based, or thermal ink printers. Within the print-head, the ink is contained in a plurality of ink conduits or channels. Power pulses cause the droplets of ink to be expelled as required from orifices or nozzles at the ends of the channels.

In a thermal ink-jet printer, the power pulse is usually produced by a heat transducer or a resistor, typically individually addressable and associated with one of the channels. As voltage is applied across a selected resistor, the temperature of the ink in the associated channel rises until some of the ink transitions from liquid to vapor. The vapor bubble expands in size, pushing a stream of ink out of the channel orifice, and then contracts as it cools, retracting the ink in the channel and pinching off the ink stream. Thus a droplet of ink is formed moving in a direction away from the channel orifice and towards the recording medium. Upon hitting the recording medium, a dot or spot of ink is deposited. The channel is then refilled by capillary action from a supply container of liquid ink.

The ink jet print-head may be incorporated into a carriage type printer, a partial width array type printer, or a page-width type printer. The carriage type printer typically has a relatively small print-head containing the ink channels and nozzles. The print-head can be functionally attached to a disposable ink supply cartridge and the combined print-head and cartridge assembly is attached to a carriage, which is reciprocated to print one swath of information (equal to the length of a column of nozzles), at a time, on a stationary recording medium, such as paper or transparencies. After the swath is printed, the paper is stepped a distance equal to the height of the printed swath or a portion thereof, so that the next printed swath is contiguous or overlapping therewith. When there are large blocks without data to print, the paper may be stepped a larger amount. This procedure is repeated until the entire page is printed. In contrast, the page width printer includes a stationary print-head having a length sufficient to print across the entire width or length of the recording medium at a time. The recording medium is continually moved past the page width print-head in a direction substantially normal to the print-head length and at a constant or varying speed during the printing process. A page width ink-jet printer is described, for instance, in U.S. Pat. No. 5,192,959.

A commonplace problem in inkjet printing technology is proper placement of ink on the paper. There is always some non-uniformity of drop volume, which can depend on the particular nozzle geometry, the temperature of the print-head, surface tension and viscosity variations in the ink, the local fluid dynamics (which are largely determined by the printing history), the power applied, and many other factors. Some of these variations are well understood, and one can make a systematic adjustment to reduce the variability. For example, using different driving pulses at different temperatures results in a fairly uniform drop volume over an extended temperature range.

One mechanism behind non-uniform drop volume is fairly well understood. Thermal inkjet print-head nozzles tend to lose water vapor or other solvents through evaporation at the open orifice openings (i.e., latency). This causes an increased ink viscosity and other changes in the ink physical properties at or near the nozzle orifices, and may also change the size and speed of subsequently ejected drops. The particular ink formulation depends on the amount of water or other solvents lost, which in turn depends on the amount of time the ink is exposed to the atmosphere, the humidity, the nominal ink formulation, the nozzle geometry, and other factors. In a severe manifestation of latency, a significant quantity of water or other solvents is lost, and a viscous plug form at the nozzle opening. It may be difficult or impossible to eject ink through this plug, and as a consequence, one or more drops may be missing from the printed image. Some ink formulations are more susceptible to this phenomenon than other, forming ink plugs in a second or less. Other ink and print-head combinations may form plugs at 60 seconds or longer.

In attempting to solve this problem, maintenance routines such as spitting into a waste bucket or flowing ink through the print-head with pressure or vacuum (i.e. priming) may be employed on a regular basis. However, these remedies are wasteful of ink and also can lower the speed and throughput of the printer. As inkjet performance surpasses three seconds per page, even less time is available for nozzle maintenance.

In attempt to solve this and related problems, people have tried to compensate for misfiring jets by determining the probability of misfire from each individual nozzle at the start of life under prescribed test conditions, irrespective of root cause. U.S. Pat. No. 6,238,112 to Girones et al. describes a method for revising the original print mask based upon which nozzles are more likely to fire based upon a statistical probability obtained during a test period.

U.S. Pat. No. 6,042,211 to Hudson et al., (hereinafter Hudson) describes a method to compensate for ink drop volume variance by modifying the CMYK tone levels. In Hudson, the drop volume at the start of life under prescribed test conditions is determined and stored on the print head/cartridge. If the print-head is found to have high or low nominal drop volume, then the data is used to increase/decrease the drop volume to the print-head by either adjusting the color lookup tables or modifying the voltages to the print-head. The method in Hudson applies to the complete print-head and not to a particular jet.

There is a need for improved methods and apparatus to compensate for drop volumes that vary due to dynamic changes in the local ink formulation.

Since it is not only possible to keep track of the time each nozzle has been left unfired, but also practical to do so because of current computer processing speeds, it is possible to forecast which pixels are likely to be small or missing.

SUMMARY OF THE INVENTION

This invention provides systems, methods, and structures that mask low drop volume print defects in inkjet printers.

This invention separately provides systems, methods and structures that track individual ink nozzle latency to detect and correct for low drop volume print defects.

This invention separately provides systems, methods and structures to detect ink nozzle latency using counters that relate to timing between firings for each individual nozzle.

This invention also separately provides systems, methods and structures to correct for anticipated ink nozzle latency-related print defects by augmenting subsequent print passes in multipass print modes to compensate for the defect.

This invention alternatively separately provides systems, methods and structures to correct for anticipated ink nozzle latency-related print defects by adjusting a printing intensity level to augment or compensate for anticipated low print volume defects.

This invention separately provides systems, methods and structures to correct for anticipated ink nozzle latency-related print defects by altering a print mask to correct for the defect.

In exemplary embodiments, low drop volume compensation is achieved at the image processing level.

In various exemplary embodiments of the present invention, there is provided a method and apparatus that determines the likelihood that a print-head nozzle will produce a low drop volume of ink based on latency, calculates the severity of the deficiency, and compensates for the low drop volume. In exemplary embodiments, this may be achieved by determining a threshold for each print-head that is based upon at least the ink formulation, the nozzle geometries, the print mode, printing direction, and the image to be printed. This threshold is a determination of how many times a single nozzle should fire within a given period of time. In exemplary embodiments, each nozzle has a counter. The counter is set and then reset to zero whenever the nozzle ejects ink or is fired. If the nozzle is not fired, the counter is incremented by one pixel unit, or other appropriate amount in other units. This will continue until the counter reaches or exceeds the threshold value. If the counter reaches or exceeds the threshold value, the nozzle is determined by the systems, methods and structures of the invention likely to produce a low drop volume print defect requiring compensation.

According to one exemplary embodiment, the compensation may be provided by increasing the intensity level of the nozzle. The intensity levels correspond to additional drops of ink that will be ejected from the nozzle in either a single pass or a multi-pass print mode.

In another exemplary embodiment, the compensation may be accomplished by modifying the print mask.

In another exemplary embodiment, combinations of intensity change and print mask change may be used to provide the compensation.

DETAILED DESCRIPTION OF PREFERRED EMBODIMENTS

Figure 1:
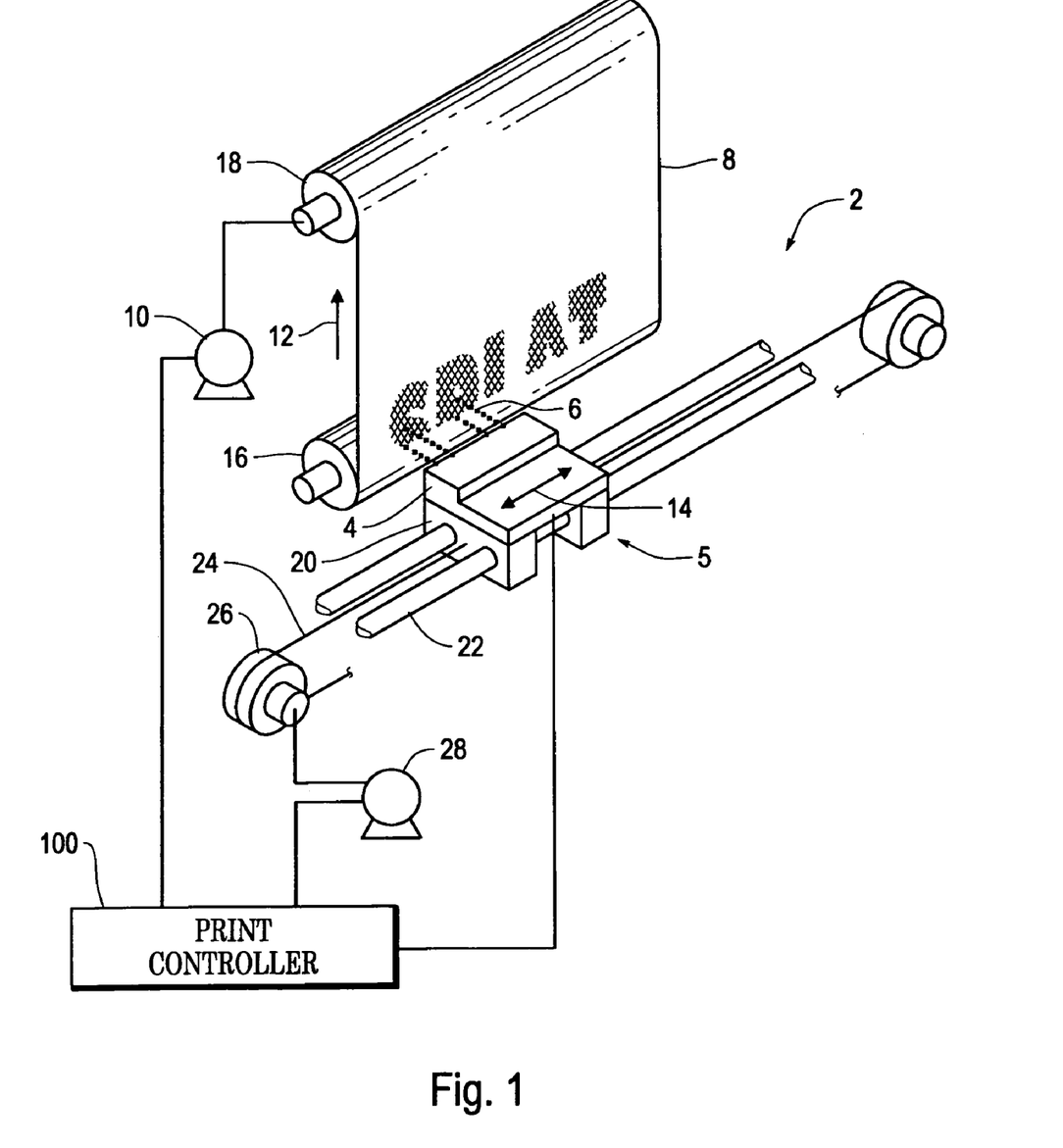
FIG. 1 is a schematic view of an exemplary printing system usable with the ink jet printing systems and methods according to this invention.
Figure 2:
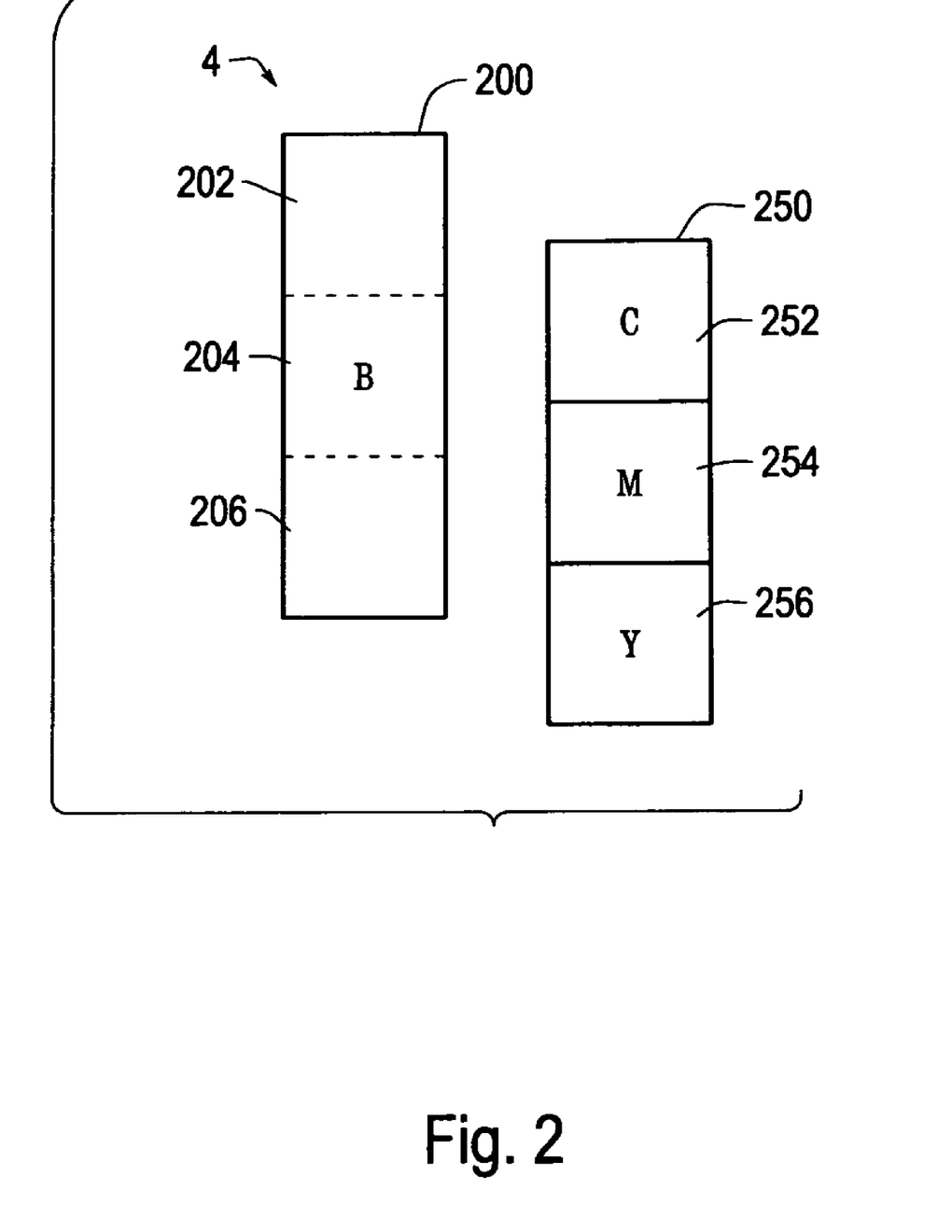
FIG. 2 is a schematic diagram of an exemplary print head usable with the ink jet printing systems and methods according to this invention.

FIG. 1 shows an exemplary carriage-type ink jet printing device 2. A linear array of droplet-producing channels (nozzles), which may be vertically oriented as shown, is housed in a print head 4 mounted on a reciprocal carriage assembly 5. In FIG. 1, print head 4 is understood to mean any single or multiple monochrome print heads, one or more color print heads, or a combination of color and black print heads, in a specified positional relationship. For illustrative purposes, a combination of black and color heads are shown in FIG. 2. Ink droplets 6 are propelled to a recording medium 8, such as a sheet of paper, that is stepped by a motor 10 a pre-selected distance (often equal to the size of the array) in a printing direction, as indicated by arrow 12, each time the print head 4 traverses across the recording medium 8 in one of the directions indicated by arrow 14. The recording medium 8 can be provided on a supply roll 16 and stepped onto takeup roll 18 by stepper motor 10 or provided in sheet form and advanced using structures, apparatuses or devices well known to those of skill in the art.

The print head 4 is fixedly mounted on a support base 20, which is adapted for reciprocal movement using any well-known structure, apparatus or device, such as two parallel guide rails 22. A cable or belt 24 and a pair of pulleys 26 can be used to reciprocally move the print head 4. One of the pulleys 26 can be powered by a reversible motor 28. The print head 4 is generally moved across the recording medium 8 perpendicularly to the direction the receiving member 8 is moved by the motor 10. Of course, other structures for reciprocating the carriage assembly 5 are possible.

The ink jet printing device 2 is operated under the control of a print controller 100. The print controller 100 transmits commands to the motors 10 and 28 and to the print head 4 to produce an image on the image recording medium 8. Furthermore, the print head controller 100 can control the ejection of inks from the print head 4.

FIG. 2 shows an exemplary structure of a print head 4 including a black print head 200 and a color print head 250. The color print head 250 can be divided into different color sections 252, 254 and 256. For example, as shown in FIG. 2, the color print head 250 is a tri-color print head that is divided into a cyan color section 252, a magenta color section 254 and a yellow color section 256. It should be understood that the color print head 250 can be divided into any number of color sections without departing from the spirit and scope of the this invention. For example there are multiple types of ink combinations, such as one print head with the inks in any order, two print heads as shown in FIG. 2, with the inks in any order, or four print heads with inks in any order.

The black print head 200 ejects only black ink from its nozzles. While the distribution of ejection nozzles on the black print head is uniform, for the purposes of this discussion, the black print head 200 can be thought of as being divided into sections first section 202, second section 204 and third section 206 that generally correspond to the color sections 252, 254 and 256. The black print head can also be positioned in an offset position relative to the color print head 250.

It is well known in the art to program and execute imaging, printing, document, and/or paper handling control functions and logic with software instructions for conventional or general purpose microprocessors, such as controller 100. This is taught by various prior patents and commercial products. Such programming or software may of course vary depending on the particular functions, software type, and microprocessor or other computer system utilized, but will be available to, or readily programmable without undue experimentation from functional descriptions, such as those provided herein, or prior knowledge of functions which are conventional, together with general knowledge in the software and computer arts. That can include object-oriented software development environments, such as C++. Alternatively, the disclosed method or apparatus may be implemented partially or fully in hardware, using standard logic circuits or a single chip using VLSI designs, or firmware.

As shown in FIG. 2, the black print head 200 may be positioned in an offset position relative to the color print head 250 so that a third, or offset, section 202 of the black print head 200 is offset behind the portions 252–256 of the color print head 250 in the printing direction 12. Furthermore, the second-section 204 is aligned with the cyan portion 252 of color print head and the first section 206 may be aligned with the magenta section 254 of the color print head 250. The yellow section 256 of the color print head 250 may be positioned ahead of the black print head 200, and therefore is offset ahead of all of the first-third portions 202-206 of the black print head 200 in the printing direction 12.

In operation, as the print head 4 travels across the recording medium 8, the print head 4 creates a swath of ink on the recording medium 8 by ejecting ink onto the recording medium. Each swath of the print head 4 is generally as tall as a color section 252, 254 and 256. In various exemplary embodiments, the swaths of the print head 4 are 104 pixels high. In the exemplary embodiment shown in FIG. 2, in order for the print head 4 to completely print one swath, the print head passes over each of the swaths of the image at least four times.

For example, in a first pass, only the yellow section 256 of the print head 4 passes over the "current" swath. Therefore, the print head 4 only ejects yellow ink to the "current" swath of the recording medium 8 during the first pass. In a second pass, the black section 206 and the magenta section 254 of print head 4 pass over the "current" swath. Accordingly, this time the print head 4 ejects both the magenta ink and a first portion of the black ink to the "current" swath of the recording medium 8. In a third pass, the black section 204 and the cyan section 252 of the print head 4 pass over the "current" swath. Accordingly, the print head 4 ejects both the magenta ink and a second portion of the black ink to the "current" swath of the recording medium 8. In a fourth pass, only the black section 202 passes over the "current" swath. Accordingly, the print head 4 ejects only a final portion of the black ink to the "current" swath of the recording medium 8.

By using this configuration, the "current" swath is traversed by each of the cyan, magenta and yellow color sections 252, 254 and 256 only once. Therefore, as each of the color sections 252, 254 and 256 pass over a swath, the corresponding color section must eject all of that color ink during that pass necessary to properly form the corresponding portion of the image.

Similarly, each section of the black print head 202, 204 and 206 passes over each swath of the recording medium 8 only once. However, because all the sections 202, 204 and 206 eject only black ink, each section 202–206 only needs to eject a portion of the total required black ink for each swath. Accordingly, each of the black print head sections 202, 204 and 206 need only transfer a portion of the black ink, such as one-third, in order to eject the total amount of black ink required to complete the swath. By doing so, inter-color bleeding can be reduced since the time between printing the color ink and the total black ink has been increased.

For example, referring to FIG. 2 for a single pass color mode, as the print head 4 travels over a "current" swath, first the yellow ink is ejected by the yellow section 256 of the color print head 250. As described above, since this is the only time the yellow section 256 passes over this "current" swath, the yellow section 256 must eject all of the necessary yellow ink. Yellow ink is generally chosen to be ejected first because it is one of the inks most prone to inter-color bleeding with the black ink.

It should be understood that, the above discussion is a simplification of common practice in that, commonly, there are non-printing sections between the three printing sections of the color head. The practical effect of this is to produce small bands that have additional delays between applications of the various inks or portions thereof.

Printing of the various swaths is based on known parameters of the printing process, including the particular nozzle geometry, ink formulation, power applied, temperature and the like. From this and data representing an image to be printed, printer controller 100 controls the timing of the individual jets of the print head 4 and the paper advancement. However, Applicants have discovered that this somewhat static analysis of criteria may still result in a non-uniform ink drop volume.

This is because thermal ink jet print-head nozzles tend to lose water vapor due to evaporation at the open nozzle orifice (i.e., latency). This latency problem has been found to be related to the timing of the firings of each nozzle. That is, as the time since a particular nozzle was last fired increases, the formulation of the ink near the nozzle orifice changes and latency problems increasingly appear. Generally, the viscosity of the ink near the nozzle orifice increases, and the ink may form may form a small or large viscous plug at the nozzle opening, making it difficult to eject ink.

Figure 6:
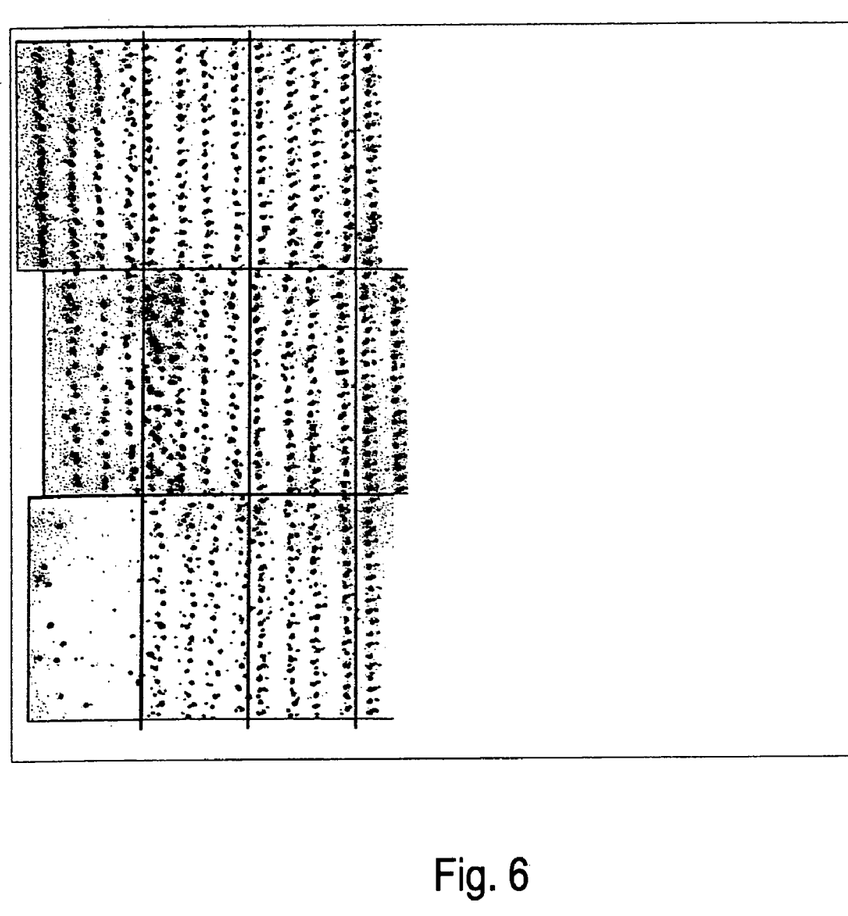
FIG. 6 is a micrograph depicting print defects after different periods of inactivity.

This problem can be systematically characterized for any print-head and ink combination by measuring the jetting behavior with different delay times between firing. For example, FIG. 6 shows a micrograph depicting ink jetting over time. For an experimental printer design using a specific ink formulation and printing process, the jetting was found to be excellent for delay times up to 5 seconds. After a delay time of 10–15 seconds, the first drop out of each nozzle appears small or missing. After a delay of about 20 seconds, the first drop out of each nozzle is completely missing and the second drop is small or missing. Therefore, this confirms that the latency problem and formation of viscous ink plugs increase over a period of time.

Aspects of the invention aim to remedy this latency problem while reducing time spent performing maintenance and minimizing wasted ink by monitoring firings and time intervals between firings for individual nozzles to predict and compensate for such latency problems.

Figure 3:
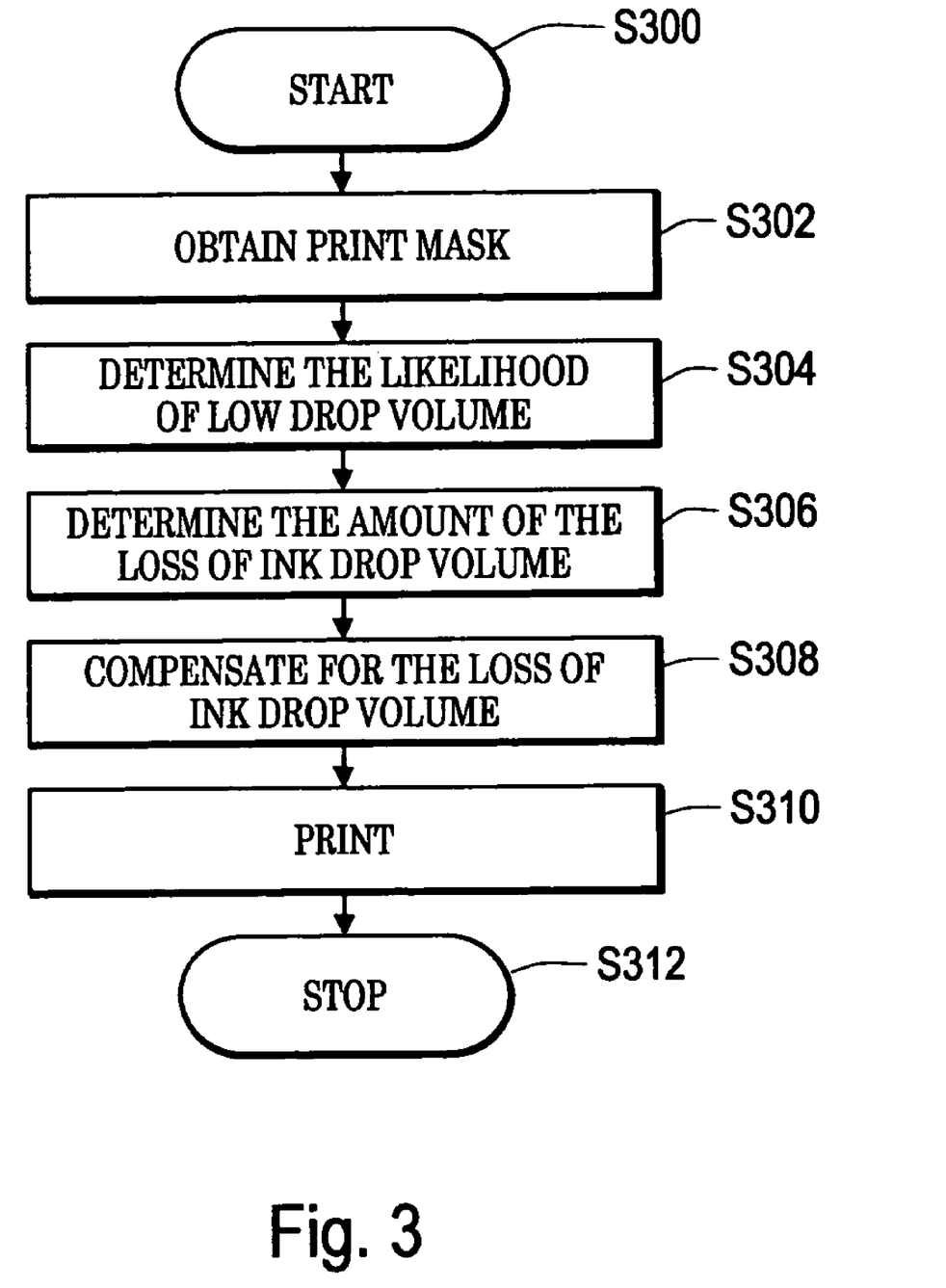
FIG. 3 is a flow chart of an exemplary method of detecting and compensating for low ink drop volume.

FIG. 3 is a flow chart outlining one exemplary embodiment of a method for determining and correcting print defects due to latency according to this invention. The process starts at step S300 and proceeds to step S302 where the print mask for an image is obtained. From step S302. flow advances to step S304. In step S304, a determination is made, on an individual nozzle basis, whether or not a nozzle is likely to cause a print defect because reduced or no ink volume will be ejected upon firing a nozzle. The reduction in or absence of ink volume in exemplary embodiments may be due to the amount of time since the nozzle was last fired.

In a preferred embodiment, the likelihood of a reduction in or loss of ink drop volume for a given nozzle can be determined by the use of a counter for each nozzle. This embodiment is further described with reference to FIG. 4.

Referring back to FIG. 3, once the determinations in step S304 are completed, the process advances to step S306, where a determination is made, based upon the factors in step S304, on how much ink is required to correct for the defect. The results of this determination will determine what steps will be taken to compensate or mask the low drop volume.

Once the loss amount is determined, flow advances to step S308, where the loss of ink volume is compensated for by one of several methods. From step S308, flow advances to step S310 where the image is printed. The process stops at step S312.

In one exemplary embodiment, if the loss of drop volume is due to a latency period for a nozzle, the image processing will compensate for this loss of drop volume by increasing the intensity of the ink levels that are deposited on a medium resulting in more drops being ejected from the nozzle at the current location. The number of additional drops used for a given intensity level may be determined, for example, by an intensity look up table.

In another embodiment, image processing compensates for this loss of drop volume by modifying the print mask itself.

Figure 4:
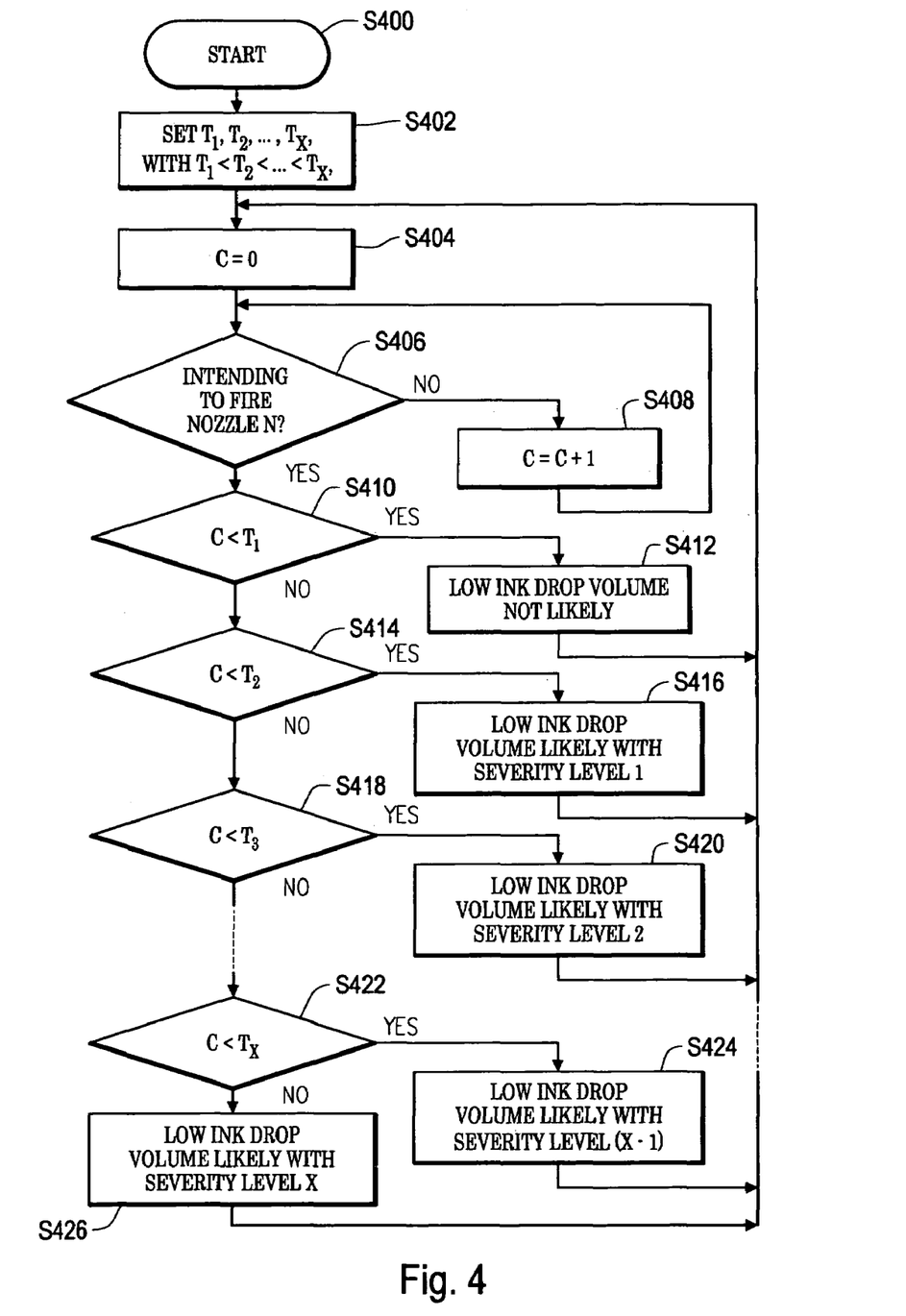
FIG. 4 is a flow chart of an exemplary embodiment of determining the likelihood of low ink drop volume.

FIG. 4 is a flow chart depicting an exemplary algorithm used to determine the likelihood of low ink volume for ink ejection nozzle. The subroutine starts at step S400. A print cartridge will have one or more predetermined threshold values T, which may be experimentally or empirically derived and set at step S402 based on characteristics of the print cartridge design and ink formulations to correlate to such aforementioned low ink volume latency problems. For example, using FIG. 6 as an example, there may be a $1^{st}$ threshold $T_1$ at which time latency causes a first drop to be small, and a $2^{nd}$ threshold $T_2$ at which time latency causes a first drop to be missing.

This threshold value may be in units of time, clock cycles, pixels, or any other applicable unit. For example, a printer may have a threshold value T of 300 in units of pixels, which means that a nozzle will have low ink drop volume if it is idle for more than 300 pixels. After the thresholds T are initially determined, the process does not need to be repeated.

The process then moves to step S404 which sets/resets individual counters C for each print head nozzle to 0. During the print process, step S406 determines if the individual nozzles will be fired. If a particular nozzle will not be fired, flow advances to step S408 where C is incremented by one pixel unit. This incrementing may also be an appropriate number of time or other units. C may also have to be adjusted according to non-printing events, such as the turn-around time of the print cartridge and carriage at the end of each print pass, paper loading and unloading times, or the priming of the print-head. At step S410, it is determined if C is less than threshold $T_1$, in which case low ink drop volume is not likely and will not require compensation. As the nozzle is fired, its counter is reset to zero and monitoring continues. If C is greater than or equal to $T_1$, then low ink drop volume is likely and will require compensation. We next determine the latency severity level. If C is less than threshold $T_2$, the latency severity level is 1 and will require appropriate compensation. In steps S414, S418–S422, C is successively compared to $T_2, T_3, \ldots, T_x$, to determine the latency severity level S416, S420, S424–S426. Next, the counter is reset to zero as the nozzle is fired, and monitoring continues.

If the counters C do not meet any of the thresholds T, no compensation is needed, and intensity level 0 can be provided. However, if a first threshold T1 is met, indicating a mild severity low volume droplet, such as a small droplet formation, intensity level 1 may be set to add compensating drops. If the higher threshold T2 is met, indicating a more severe dropout, such as one or more missing drops, intensity level 2 can be set to compensate by adding more droplets to compensate for missing ink due to latency.

Figure 5A:
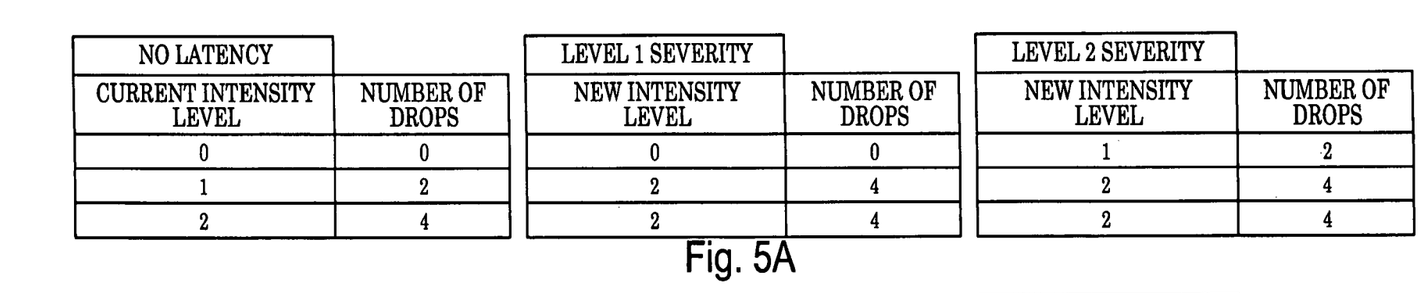
FIGS. 5A, 5B and 5C are examples of intensity tables according to this invention.
Figure 5B:
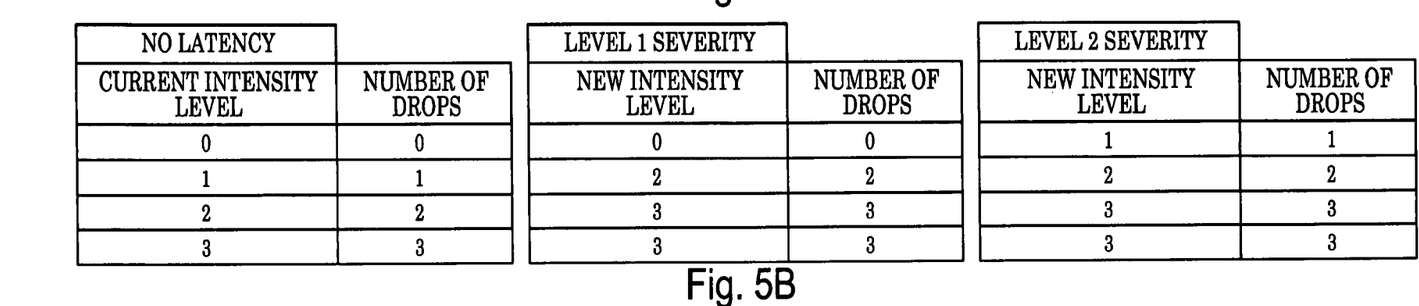
Figure 5C:
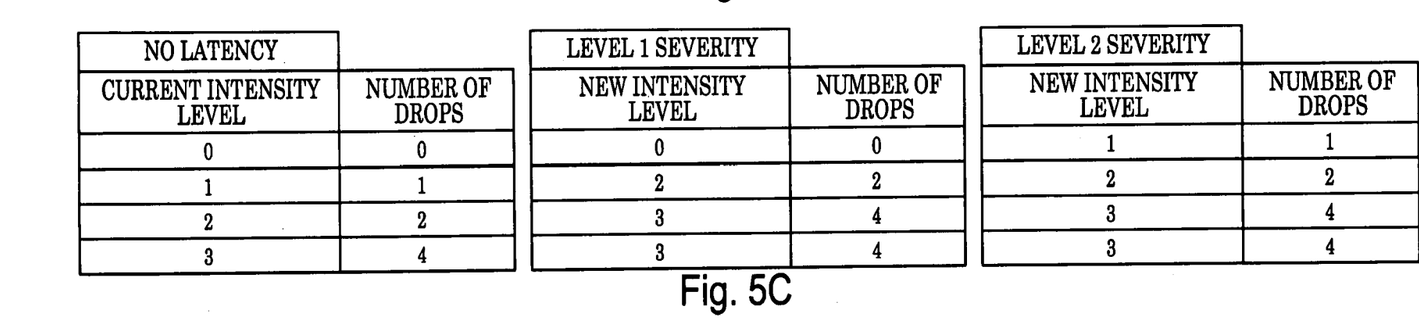

FIGS. 5A, 5B and 5C are examples of intensity tables, which can provide low volume compensation (step S308). In these three examples, there are two thresholds and severity levels for latency. For example, FIG. 5A shows the intensity is set at two bit intervals. For example, at intensity level 0, 0 drops are added to the deficient pixel location, at intensity level 1, two drops of ink are added and at intensity level 2, four drops of ink are added to the deficient pixel location. If low drop volume is found to be likely with severity level 1, then the intensity levels 0, 1, and 2 are bumped up to levels 0, 2, and 2, respectively. If low drop volume is found to be likely with severity level 2, then the intensity levels are bumped up to 2, 4, and 4, respectively. FIGS. 5B and 5C show examples with four intensity levels and two severity levels. It is understood by those skilled in the art, that a given intensity level could result in different increments of additional drops of ink. Suitable systems and methods for adjusting intensity levels can be found in U.S. Pat. No. 6,189,993 to Mantell, which is incorporated herein by reference in its entirety.

This step may also be performed by either ejecting multiple drops in the scanning direction or by ejecting ink during multiple passes of the print-head at the location where low drop volume is predicted. The method of using either single or multiple passes is described in U.S. Pat. No. 6,264,298 to Mantell and U.S. Pat. No. 6,411,399, to Mantell et al., which are hereby incorporated by reference in their entirety.

Referring again to FIG. 3, step S308 in another embodiment may compensate for the loss of ink drop volume by modifying the print mask itself. Modifying the print mask to compensate for low ink drop volume can be accomplished in several ways depending on the image that is being printed and the ink jet throughput.

In accordance with one exemplary embodiment, the print mask can be modified by reversing the print order of the pixel. For example, if a pixel, that is intended to be printed in the left to right direction, is determined to be likely to have a low drop volume, that pixel will then also be printed in the reverse, or right to left, direction. In addition, the problem nozzle may be caused to spit i.e., briefly fire, into a waste area that may be, for example, located at either ends of the carriage, before printing in the reverse direction.

Alternately, if printing in a multi-pass mode, the printing pattern or mask may be adjusted to minimize low droplet problems by providing a mask that achieves printing without any counters C reaching the thresholds T. That is, the print mask may be modified so as to achieve firing of the jets in a pattern that does not cause, or at least reduces, latency problems. Further, the print mask of a subsequent pass may be modified to add droplets at pixels where low droplet problems are believed to occur so that a final image corrects for the latency issue.

In still another embodiment, if a pixel is determined to likely have a low drop volume, the print mask may be modified to cause the nozzle to fire, one pixel location ahead of the intended pixel location, as well as, the intended pixel location. This will likely result in a low drop volume at the ahead position that will not substantively affect image output, but will overcome the latency problem so that the nozzle fires at the subsequent desired pixel.

In still another embodiment, if a pixel is determined to be likely to have low drop volume, drops from another print-head may be used to mask the print defect. For example, if the original print mask requires that the pixel is to be printed in black (K), the pixel may be printed with process black by using CMY drops at that pixel location instead.

It is also contemplated that various combinations of these compensation methods may be used. For example, if an image requires a large intensity adjustment and adjusting to a highest intensity level will not fully compensate for the latency problem, one may also modify the print mask to print at the desired pixel in subsequent passes or fire at adjacent pixels to remedy the latency problem.

There has been described various exemplary apparatus and method for image processing to mask low drop volume print defects in inkjet printers. While this invention has been described in conjunction with specific embodiments thereof, it is evident that many alternatives, modifications, and variations will be apparent to those skilled in the art. For instance, the present invention is not limited to thermal ink jet printing, but may include all types of fluid ejection systems printing where liquid drops are deposited on a medium or an intermediate and subject to latency problems.

What is claimed is:

1. A predictive method for correcting a low drop volume of an ink ejection nozzle in a printing system comprising:
    (a) determining a likelihood that the ink ejection nozzle will eject a low volume of ink based on a time period of inactivity of the ink ejection nozzle since a last firing of the ink ejection nozzle;
    (b) determining a correction factor to correct the low drop volume of ink ejected from the ink ejection nozzle based on the inactivity; and
    (c) compensating for the low drop volume of ink.

2. The method according to claim 1, wherein (c) further comprises changing a step level according to the amount of ink needed to correct the low drop volume of ink.

3. The method of claim 2, wherein the step level corresponds to drops of ink.

4. The method of claim 1, wherein (c) comprises modifying the print mask.

5. The method of claim 4, wherein modifying the print mask comprises:
    causing the ink ejection nozzle to fire one location before a location indicated by the print mask to have a likelihood of a low volume of ink; and
    ejecting ink at the location indicated by the print mask.

6. The method of claim 1, wherein (a) includes setting a threshold value correlated to a time at which a change in drop volume is likely, providing a counter that monitors time periods of ink ejection nozzle inactivity, and determines likelihood of low ink volume when the counter reaches the threshold value.

7. The method of claim 1, wherein the correction factor is based on empirical data.

8. The method of claim 1, wherein the correction factor is based on computational models.

9. The method of claim 1, wherein the correction factor is based on a combination of empirical data and computational models.

10. An apparatus for predictively correcting a low drop volume of an ink ejection nozzle in a printing system, comprising:
    (a) obtaining means for obtaining a print mask;
    (b) a first determining means for determining a likelihood that an ink ejection nozzle will eject a low volume of ink based on a time period of inactivity of the ink ejection nozzle since a last firing of the ink ejection nozzle;
    (c) a second determining means for determining the amount of ink ejected from the ink ejection nozzle needed to correct the low drop volume of ink;
    (d) compensating means for compensating for the low drop volume of ink; and
    (e) monitoring means for monitoring the time period of inactivity of the ink ejection nozzle.

11. The apparatus of claim 10, wherein the first determining means includes a counter.

12. The apparatus according to claim 10, wherein the compensating means includes means for changing a step level according to the amount of ink needed to correct the low drop volume of ink.

13. The apparatus of claim 12, wherein the step level corresponds to drops of ink.

14. The apparatus of claim 12, wherein the compensating means modifies the print mask.

15. The apparatus of claim 14, wherein the compensating means modifies the print mask by reversing a print order of one or more individual pixels in the mask.

16. The apparatus of claim 14, wherein the compensating means modifies the print mask by augmenting subsequent print passes in a multiple pass mode to compensate for the low drop volume of ink.

17. The apparatus of claim 14, wherein the means for modifying the print mask comprises;
    means for causing the ink ejection element to eject ink one location before a location indicated by the print mask; and
    means for ejecting ink at a location indicated by the print mask.

18. The apparatus of claim 13, wherein the compensating means further comprises a means for modifying the print mask.

19. The apparatus of claim 10, wherein the change in drop volume is empirically desired.

20. The apparatus of claim 10, wherein the change in drop volume is based on computational models.

21. The apparatus of claim 10, wherein the change in drop volume is based on a combination of empirical data and computational models.

22. The method of claim 4, wherein modifying the print mask includes substituting drops from a second print-head to mask print defects from a first print-head.

23. The apparatus of claim 14, wherein the compensating means modifies the print mask by substituting drops from a second print-head to mask print defects from a first print-head.

24. The method of claim 4, wherein modifying the print mask by augmenting subsequent print passes in a multiple pass mode to compensate for the low drop volume of ink.

25. A predictive method for correcting a low drop volume of an ink ejection nozzle in a printing system comprising:
    (a) determining a likelihood that the ink ejection nozzle will eject a low volume of ink based on a time period of inactivity of the ink ejection nozzle since a last firing of the ink ejection nozzle;

(b) determining a correction factor to correct the low drop volume of ink based on the inactivity ejected from the ink ejection nozzle; and (c) compensating for the low drop volume of ink by modifying a print mask to reverse a print order of one or more individual pixels in the print mask.

* * * * *